US012621399B2

(12) United States Patent
Masuda et al.

(10) Patent No.: US 12,621,399 B2
(45) Date of Patent: May 5, 2026

(54) INFORMATION PROCESSING APPARATUS AND METHOD, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventors: Kensaku Masuda, Kanagawa (JP); Keiichi Hotta, Kanagawa (JP); Haruko Kawano, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/177,956

(22) Filed: Mar. 3, 2023

(65) Prior Publication Data

US 2024/0106961 A1 Mar. 28, 2024

(30) Foreign Application Priority Data

Sep. 22, 2022 (JP) ................................. 2022-151755

(51) Int. Cl.
*H04N 1/34* (2006.01)
*H04N 1/00* (2006.01)

(52) U.S. Cl.
CPC ......... *H04N 1/344* (2013.01); *H04N 1/00474* (2013.01)

(58) Field of Classification Search
None
See application file for complete search history.

(56) References Cited

U.S. PATENT DOCUMENTS

2009/0303525 A1* 12/2009 Yoshida ............. G03G 15/5087
                                                                358/1.15
2017/0070642 A1* 3/2017 Miyamoto ............... B41J 29/38

FOREIGN PATENT DOCUMENTS

JP 2006-195893 A 7/2006

* cited by examiner

*Primary Examiner* — Lennin R Rodriguezgonzalez
(74) *Attorney, Agent, or Firm* — Oliff PLC

(57) ABSTRACT

An information processing apparatus includes a processor configured to: receive an instruction to execute sequential processing, the sequential processing being processing for sequentially executing multiple preset operations which are related to each other; present plural options for an operation included in the sequential processing, fees for the plural options being different from each other; and calculate a fee for an option selected from the plural options and present the calculated fee before executing the sequential processing.

8 Claims, 11 Drawing Sheets

FIG. 4

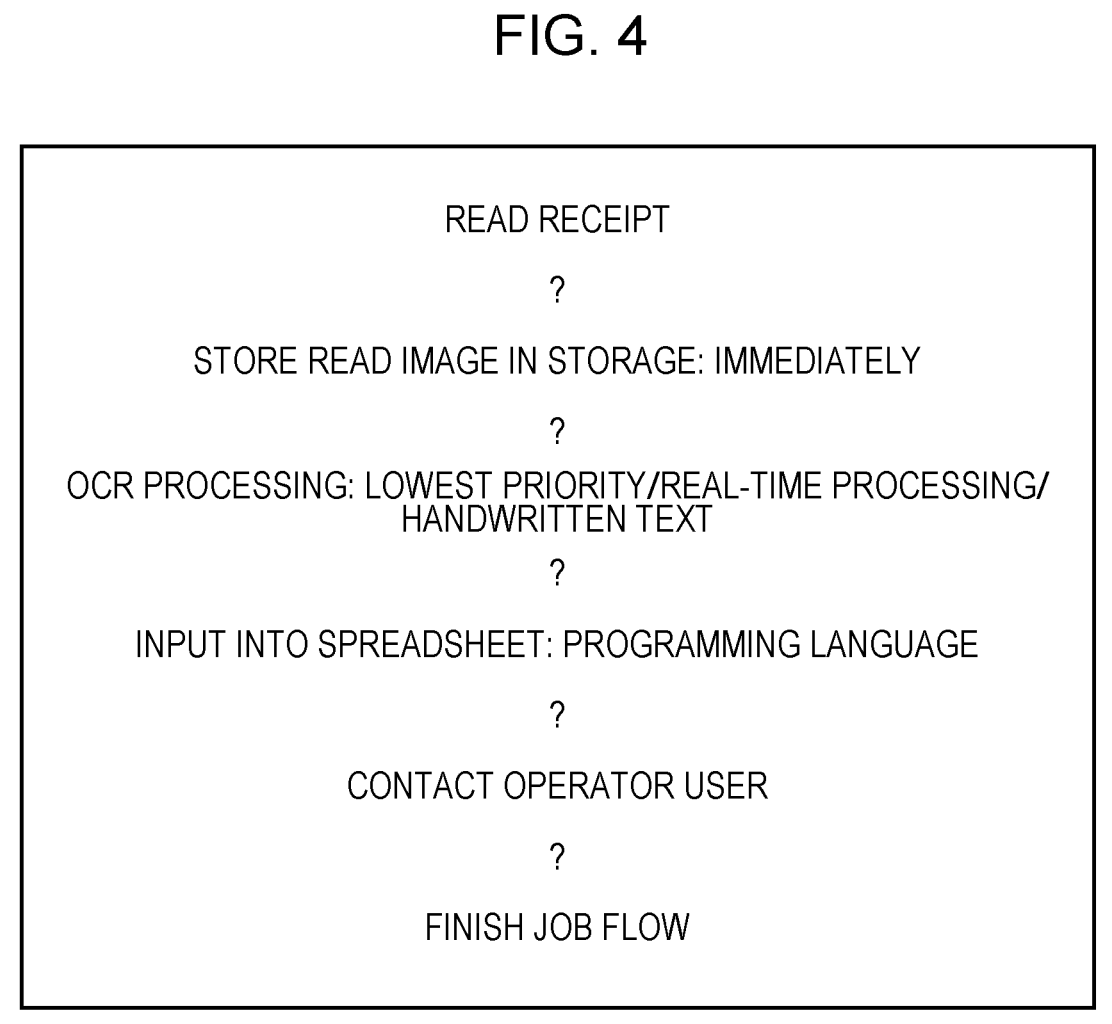

READ RECEIPT

?

STORE READ IMAGE IN STORAGE: IMMEDIATELY

?

OCR PROCESSING: LOWEST PRIORITY/REAL-TIME PROCESSING/
HANDWRITTEN TEXT

?

INPUT INTO SPREADSHEET: PROGRAMMING LANGUAGE

?

CONTACT OPERATOR USER

?

FINISH JOB FLOW

FIG. 5

| CONTENT OF OPERATION | UNIT PRICE |
|---|---|
| READING | 10 |
| STORING IN STORAGE | — |
| REAL-TIME-SERVICE OCR PROCESSING FOR HANDWRITTEN TEXT | 50 |
| INPUTTING INTO SPREADSHEET | 1 |
| CONTACTING OPERATOR USER | 0. 1 |

FIG. 6

| CONTENT OF OPERATION | UNIT PRICE |
|---|---|
| READING | 10 |
| STORING IN STORAGE | — |
| REAL-TIME-SERVICE OCR PROCESSING FOR HANDWRITTEN TEXT | 50 |
| WITHIN-SEVERAL-HOUR-SERVICE OCR PROCESSING FOR HANDWRITTEN TEXT | 30 |
| WITHIN-SEVERAL-DAY-SERVICE OCR PROCESSING FOR HANDWRITTEN TEXT | 10 |
| HIGH-SPEED DOCUMENT DOWNLOADING | 5 |
| LIMITED-SPEED DOCUMENT DOWNLOADING | — |
| INPUTTING INTO SPREADSHEET | 1 |
| CONTACTING OPERATOR USER | 0. 1 |

Selected Service: contract

Content of Job Flow

1. Document reading: unit price 10

2. Within-several-day-service OCR processing: unit price 10

3. Extracting specific items (e.g. contract name/contractor name)

4. Registering in cloud service: unit price 1

5. Contacting operator user: unit price 0.1

Wallet balance is becoming low.

Select OCR

Cancel          Start

FIG. 10

| CONTENT OF OPERATION | UNIT PRICE |
|---|---|
| READING | 10 |
| STORING IN STORAGE | — |
| HIGH-PERFORMANCE OCR PROCESSING FOR HANDWRITTEN TEXT | 50 |
| LOW-PERFORMANCE OCR PROCESSING FOR HANDWRITTEN TEXT | 30 |
| HIGH-SPEED DOCUMENT DOWNLOADING | 5 |
| LIMITED-SPEED DOCUMENT DOWNLOADING | — |
| INPUTTING INTO SPREADSHEET | 1 |
| CONTACTING OPERATOR USER | 0. 1 |

FIG. 11

| CONTENT OF OPERATION | | UNIT PRICE |
|---|---|---|
| READING | | 10 |
| STORING IN STORAGE | | – |
| REAL-TIME-SERVICE OCR PROCESSING FOR HANDWRITTEN TEXT | PERFORMANCE: HIGH | 50 |
| | PERFORMANCE: LOW | 30 |
| WITHIN-SEVERAL-HOUR-SERVICE OCR PROCESSING FOR HANDWRITTEN TEXT | PERFORMANCE: HIGH | 30 |
| | PERFORMANCE: LOW | 10 |
| WITHIN-SEVERAL-DAY-SERVICE OCR PROCESSING FOR HANDWRITTEN TEXT | PERFORMANCE: HIGH | 10 |
| | PERFORMANCE: LOW | 5 |
| HIGH-SPEED DOCUMENT DOWNLOADING | | 5 |
| LIMITED-SPEED DOCUMENT DOWNLOADING | | – |
| INPUTTING INTO SPREADSHEET | | 1 |
| CONTACTING OPERATOR USER | | 0. 1 |

INFORMATION PROCESSING APPARATUS AND METHOD, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-151755 filed Sep. 22, 2022.

BACKGROUND

(i) Technical Field

The present disclosure relates to an information processing apparatus and method, an information processing system, and a non-transitory computer readable medium.

(ii) Related Art

Japanese Unexamined Patent Application Publication No. 2006-195893 discloses the following job flow service system. A job flow service device creates an instruction, generates charging information based on the amount of input money, and sends the charging information to a multifunction device. The multifunction device performs scanning processing in accordance with the instruction, subtracts the amount of money for the scanning processing from the amount indicated by the charging information, sends scan data, the instruction, and the charging information to an image processing device. A file management device stores a PDF file in accordance with the instruction and subtracts the amount of money for the storage of the PDF file from the amount indicated by the charging information, and sends the charging information, together with notification that the job flow has finished, to the job flow service device. The job flow service device checks from the charging information whether there is any change to be returned, and if any, it sends information on the presence of change to a PC.

SUMMARY

When a user is charged for the execution of sequential processing, which is processing for sequentially executing multiple preset operations related to each other, a fee is simply calculated from the content of the operations and is charged to the user after the sequential processing is executed. Hence, it is not possible to set sequential processing by taking a fee into account before the execution of the sequential processing.

Aspects of non-limiting embodiments of the present disclosure relate to an information processing apparatus and method, an information processing system, and a non-transitory computer readable medium that make it possible to set sequential processing by taking a fee into account before the execution of the sequential processing and then to execute the sequential processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive an instruction to execute sequential processing, the sequential processing being processing for sequentially executing multiple preset operations which are related to each other; present plural options for an operation included in the sequential processing, fees for the plural options being different from each other; and calculate a fee for an option selected from the plural options and present the calculated fee before executing the sequential processing.

BRIEF DESCRIPTION OF THE DRAWINGS

An exemplary embodiment of the present disclosure will be described in detail based on the following figures, wherein:

FIG. 4 illustrates an example of a job flow;

FIG. 5 illustrates a job flow service provided by an example of a known charging system;

FIG. 6 illustrates an example of a job flow service in which multiple options with different fees are provided for some of the operations in a job flow;

FIG. 10 illustrates an example of options for which fees are set in accordance with the operation performance; and FIG. 11 illustrates an example of options for which fees are set in accordance with a combination of the operation performance and the required time.

DETAILED DESCRIPTION

Figure 1:
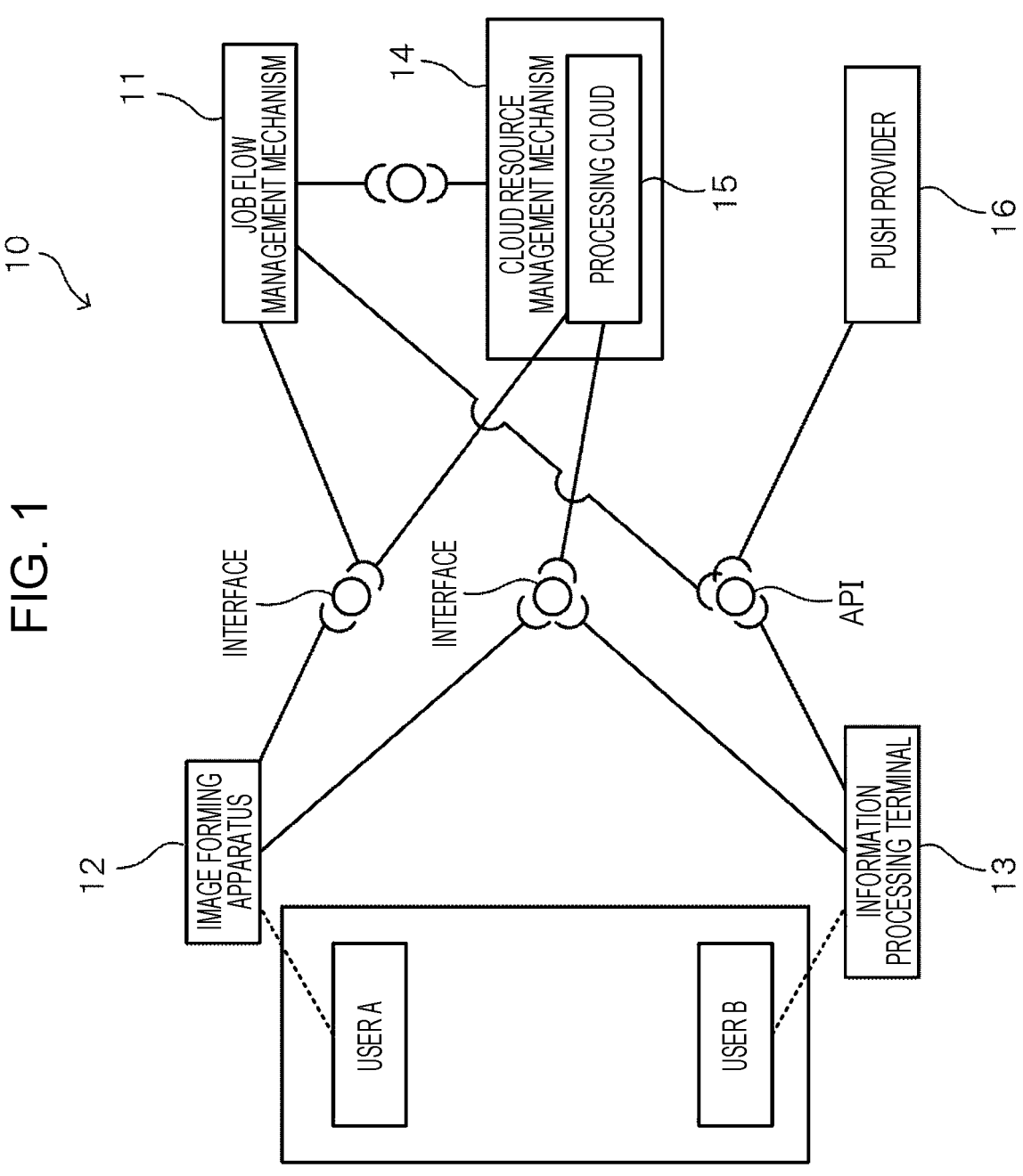
FIG. 1 is a schematic diagram illustrating the configuration of an information processing system according to the exemplary embodiment.

An exemplary embodiment of the disclosure will be described below in detail with reference to the accompanying drawings. FIG. 1 is a schematic diagram illustrating the configuration of an information processing system 10 according to the exemplary embodiment.

The information processing system 10 performs operations for reading a document and for processing the read document based on a job flow and charges for the individual operations in accordance with the processing results. A job flow is sequential processing for sequentially executing multiple preset operations which are related to each other. In the disclosure, a job is an operation or a set of operations executed by an image forming apparatus 12 or a cloud service, for example, to implement a predetermined function.

As illustrated in FIG. 1, the information processing system 10 according to the exemplary embodiment includes an image forming apparatus 12, an information processing terminal 13, a job flow management mechanism 11, which is an example of an information processing apparatus, a cloud resource management mechanism 14, and a push provider 16.

The image forming apparatus 12 allows a user to perform operations, such as selecting a job flow and providing an instruction to execute the job flow. The image forming apparatus 12 is connected to the job flow management mechanism 11, the information processing terminal 13, and the cloud resource management mechanism 14 via a corresponding interface. The image forming apparatus 12 executes processing, such as reading and sending a document in accordance with a job flow defined by the job flow management mechanism 11.

As the information processing terminal 13, a personal computer (PC), a tablet, or a smartphone, for example, may be used. As in the image forming apparatus 12, the information processing terminal 13 allows a user to perform an operation, such as selecting a job flow. The information processing terminal 13 is connected to the cloud resource management mechanism 14 via an interface and also to the push provider 16 via an application programming interface (API).

The image forming apparatus 12 and the information processing terminal 13 are used by member users of a group, such as user A and user B, and select a job flow and send and receive a job flow result.

The job flow management mechanism 11 functions as a mechanism for performing charging and management, which are handled as common themes for a group, and provides a job flow as a cloud service. The job flow management mechanism 11 implements various functions. Examples of the major functions are defining of a job flow to be provided to a user, management of users, presenting of a list of available job flows, calculating of a fee for a job flow, and informing a user of a job flow result and execution of final processing.

The cloud resource management mechanism 14 performs management and adjustment of computing resources used in a tenant provided by a certain company. In the exemplary embodiment, the cloud resource management mechanism 14 is employed for dynamically procuring computing resources and implementing overall optimal resource planning.

A processing cloud 15 is resources managed by the cloud resource management mechanism 14 and functions as a processing node for implementing a job flow. An example of the processing cloud 15 is a tenant in a cloud service provider. Examples of the services provided by the processing cloud 15 are a storage service, an optical character recognition (OCR) service, and a service for linking a processing result, for example, with a spreadsheet application and a programming language, for example. The storage service is a service for storing a read document image or an OCR recognition result, for example. The OCR service is a service for reading an image and outputting recognized text, for example. The service for linking a processing result, for example, with a spreadsheet application and a programming language, for example, is, if the processing result is a result of recognizing a business card, a service for automatically inputting the recognized text of the business card into a spreadsheet.

The push provider 16 provides a web push service for automatically delivering a message onto the screen of a cellular phone, such as a smartphone, or a PC.

In the information processing system 10 according to the exemplary embodiment, services provided by a cloud server, for example, are services provided by the job flow management mechanism 11, cloud resource management mechanism 14, processing cloud 15, and push provider 16. In this case, services provided by different cloud servers or services provided by a single cloud server may be used as services provided by the job flow management mechanism 11, cloud resource management mechanism 14, processing cloud 15, and push provider 16. Alternatively, some of the services provided by the job flow management mechanism 11, cloud resource management mechanism 14, processing cloud 15, and push provider 16 may be services provided by different cloud servers.

Figure 2:
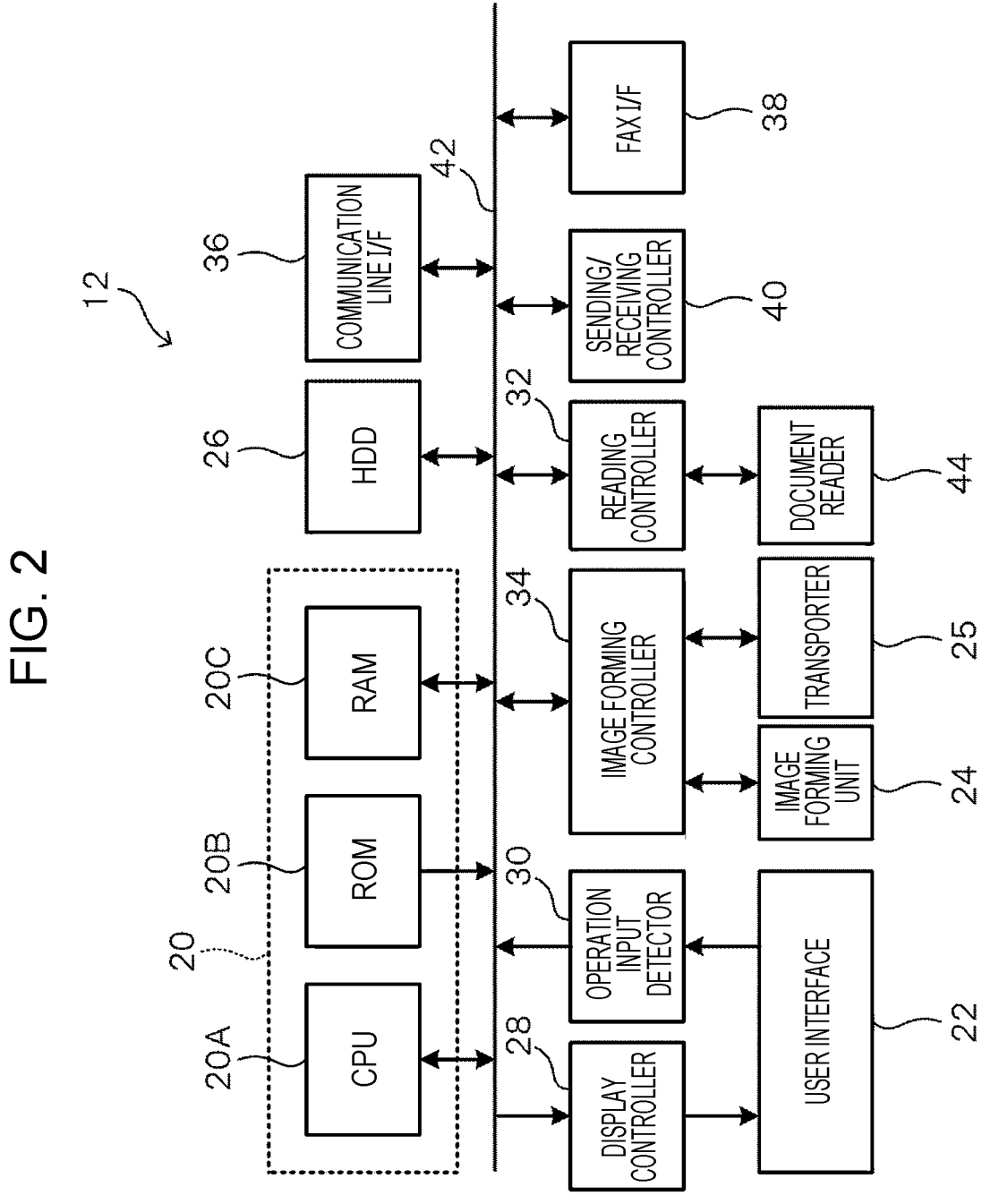
FIG. 2 is a block diagram illustrating major parts of the electrical configuration of an image forming apparatus in the information processing system according to the exemplary embodiment.

The configuration of the image forming apparatus 12 will be discussed below. FIG. 2 is a block diagram illustrating major parts of the electrical configuration of the image forming apparatus 12 in the information processing system 10 according to the exemplary embodiment.

As illustrated in FIG. 2, the image forming apparatus 12 includes a control unit 20 having a central processing unit (CPU) 20A, a read only memory (ROM) 20B, and a random access memory (RAM) 20C. The CPU 20A controls the entire operation of the image forming apparatus 12. The RAM 20C is used as a work area, for example, for the CPU 20A to execute various programs. In the ROM 20B, various control programs and various parameters, for example, are prestored. In the image forming apparatus 12, the CPU 20A, the ROM 20B, and the RAM 20C of the control unit 20 are electrically connected to each other via a system bus 42.

The image forming apparatus 12 includes a hard disk drive (HDD) 26, a display controller 28, and an operation input detector 30. The HDD 26 stores various types of data and application programs. The display controller 28 is connected to a user interface 22 to control the displaying of various screens, such as operation screens, on a display of the user interface 22. The operation input detector 30 is also connected to the user interface 22 to detect an operation instruction input via the user interface 22. In the image forming apparatus 12, the HDD 26, the display controller 28, and the operation input detector 30 are electrically connected to the system bus 42. Although the HDD 26 is used as a storage device in the image forming apparatus 12 of the exemplary embodiment, another non-volatile storage, such as a flash memory, may alternatively be used as the storage device.

The image forming apparatus 12 also includes a reading controller 32 and an image forming controller 34. The reading controller 32 controls an optical image-reading operation performed by a document reader 44 and a document feeding operation performed by a document feeder. The image forming controller 34 controls image forming processing executed by an image forming unit 24 and an operation of transporting of a sheet to the image forming unit 24 performed by a transporter 25. The image forming apparatus 12 also includes a communication line interface (communication line I/F) 36, a fax interface (fax I/F) 38, and a sending/receiving controller 40. The communication line I/F 36 is connected to various communication lines and sends and receives communication data to and from external devices, such as a cloud server 18 (see FIG. 3), connected to the communication lines. The fax I/F 38 is connected to a telephone line (not shown) and sends and receives fax data to and from a fax device connected to the telephone line. The sending/receiving controller 40 controls sending/receiving of fax data performed via the fax I/F 38. In the image forming apparatus 12, the sending/receiving controller 40, reading controller 32, image forming controller 34, communication line I/F 36, and fax I/F 38 are electrically connected to the system bus 42.

With the above-described configuration, by using the CPU 20A, the image forming apparatus 12 makes access to each of the RAM 20C, the ROM 20B, and the HDD 26. By using the CPU 20A, the image forming apparatus 12 also performs various control operations for, for example: displaying of operation screens and information, such as various messages, on the display of the user interface 22 via the display controller 28; activation of the document reader 44 and the document feeder via the reading controller 32; activation of the image forming unit 24 and the transporter 25 via the image forming controller 34; sending/receiving of communication data via the communication line I/F 36; and sending/receiving of fax data via the fax I/F 38 under the control of the sending/receiving controller 40. By using the CPU 20A, the image forming apparatus 12 also identifies the content of operation performed on the user interface 22, based on operation information detected by the operation input detector 30, and then performs various control operations based on the identified content of operation.

Figure 3:
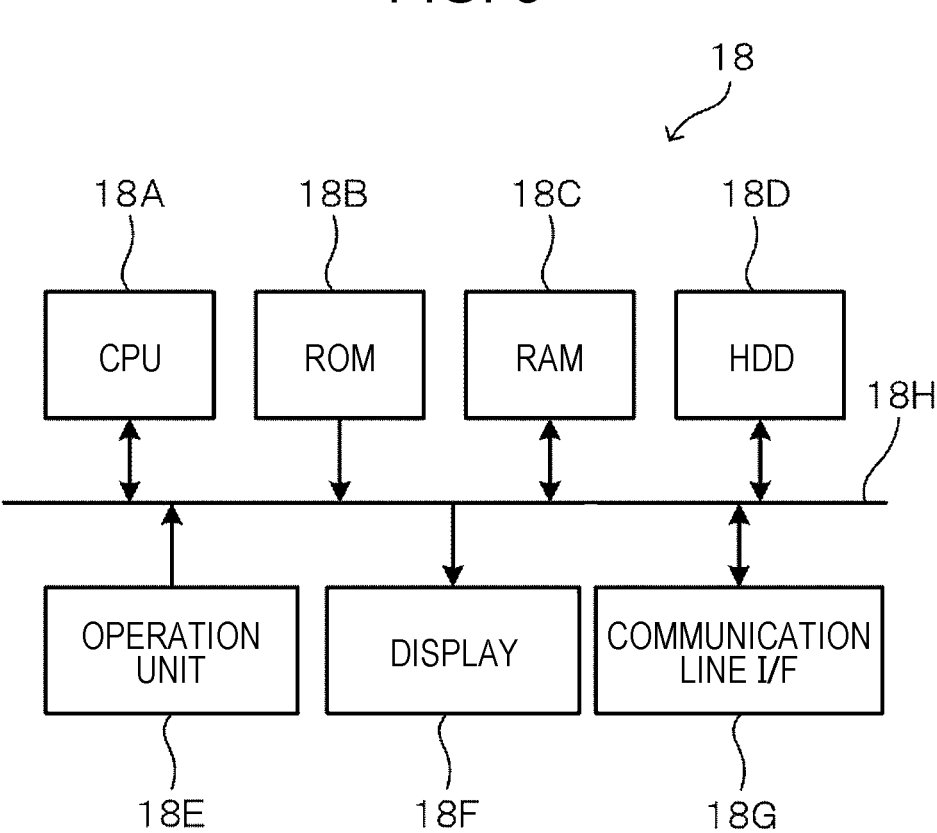
FIG. 3 is a block diagram illustrating major parts of the electrical configuration of a cloud server in the information processing system according to the exemplary embodiment.

The configuration of a cloud server for providing a cloud service, such as the job flow management mechanism 11, cloud resource management mechanism 14, processing cloud 15, and push provider 16, will be discussed below. FIG. 3 is a block diagram illustrating major parts of the electrical configuration of a cloud server 18 in the information processing system 10 according to the exemplary embodiment. A single cloud server 18 or plural cloud servers 18 may be provided. An explanation will be given only of the configuration of a typical cloud server 18 since the configurations of all the cloud servers 18 are similar.

As illustrated in FIG. 3, the cloud server 18 in the exemplary embodiment includes a CPU 18A, a ROM 18B, a RAM 18C, an HDD 18D, an operation unit 18E, a display 18F, and a communication line interface (I/F) 18G. The CPU 18A controls the entire operation of the cloud server 18. In the ROM 18B, various control programs and various parameters, for example, are prestored. The RAM 18C is used as a work area, for example, for the CPU 18A to execute various programs. In the HDD 18D, various types of data and application programs, for example, are stored. The operation unit 18E, which is constituted by a keyboard and a mouse, for example, is used for inputting various items of information. The display 18F is used for displaying various items of information. The communication line OF 18G is connected to various communication lines and sends and receives various types of data to and from other devices connected to the communication lines. The above-described elements of the cloud server 18 are electrically connected to each other via a system bus 18H. Although the HDD 18D is used as a storage device in the cloud server 18 in the exemplary embodiment, another non-volatile storage, such as a flash memory, may alternatively be used as the storage device.

With the above-described configuration, by using the CPU 18A, the cloud server 18 makes access to each of the ROM 18B, the RAM 18C, and the storage 18D. By using the CPU 18A, the cloud server 18 also obtains various types of data via the operation unit 18E, displays various items of information on the display 18F, and performs control to send and receive communication data via the communication line OF 18G.

In the exemplary embodiment, the CPU 18A executes an information processing program stored in the ROM 18B or the HDD 18D so as to function as the job flow management mechanism 11. The job flow management mechanism 11 then receives an instruction to execute a job flow as sequential processing from the image forming apparatus 12, for example, presents multiple options for an operation included in the job flow, whose fees are different, and calculates a fee for a selected option and presents the calculated fee before executing the job flow.

A basic job flow will be explained. FIG. 4 illustrates an example of a job flow.

In the exemplary embodiment, basically, a job flow defined by a user is executed, and a fee is charged in accordance with an execution result.

As an example of a basic job flow, the job flow shown in FIG. 4 will be taken. In this job flow, operations: reading a receipt; storing a read image of the receipt in a common storage; executing OCR processing; inputting a recognition result into a spreadsheet; contacting an operator user; and finishing the job flow, are sequentially executed.

A fee is set for each operation of the job flow. It is assumed that fees for the individual operations are as those shown in FIG. 5. FIG. 5 illustrates a job flow service provided by an example of a known charging system. In the example in FIG. 5, the unit prices (Japanese yen) of the individual operations are as follows: reading is 10; storing in a storage is 0; real-time-service OCR processing for handwritten text is 50; inputting the OCR result into a spreadsheet is 1; and contacting an operator user is 0.1.

It is assumed that the fee is charged to a wallet of an organization to which the user belongs and the wallet is shared by a group. The upper limit that the group in the organization can spend may be set if necessary.

A less expensive function can be suggested to a user in accordance with the balance in the wallet so that the user can continue using a service while avoiding exceeding a limited amount.

In a known charging system for a job flow, after the job flow is executed, a fee is simply calculated from the content of operations and is charged to a user. Hence, it is not possible to set a job flow by considering a fee before the execution of the job flow.

In the exemplary embodiment, a job flow is set by taking a fee into account before the execution of the job flow.

For example, for a high-cost operation, such as OCR processing, a less expensive service can be provided if the following options are offered.

Executing processing in an off-peak time period by using auction-type resources, for example Using an implementation style which is time-consuming but requires fewer resources by the use of low performance resources, for example This system is, however, raises some issues, such as it is not suitable for real-time processing, it is time-consuming and is hard to know when processing finishes, and if the amount of processing is not sufficient, it is difficult to allocate resources to such processing.

To address these issues, in the exemplary embodiment, the following functions are added.

1. Instead of providing real-time processing, if necessary, a processing result is sent to the information processing terminal 13, such as a mobile terminal, of a user when processing is completed.

2. Depending on how urgent a user requires a processing result, several options are provided, such as real time, within several hours, within one day, within about one week.

With these functions, a job flow service, such as that shown in FIG. 6, can be provided. FIG. 6 illustrates an example of a job flow service in which multiple options with different fees are provided for some of the operations included in a job flow.

In the example in FIG. 6, the unit prices (Japanese yen) of the operations are as follows: reading is 10; storing in a storage is 0; real-time-service OCR processing for handwritten text is 50; within-several-hour-service OCR processing for handwritten text is 30; within-several-day-service OCR processing for handwritten text is 10; high-speed document downloading is 5, limited-speed document downloading is 0, inputting the OCR result into a spreadsheet is 1; and contacting an operator user is 0.1.

Combining these options can provide the following services at a low price.

1. A document is read outside a company and a processing result is received later in the company.
2. A processing result of a material which is not required right away, such as a receipt, is received later before a set date.
3. A large number of sheets, such as questionnaires, are processed together at a later date.
4. A lower-cost service is suggested in accordance with the wallet balance.
5. The transfer speed of a document is limited in accordance with the wallet state.
6. The use of color copying or large-size copying is prohibited or limited, and, if large-size copying is limited, another option, such as reduced-size copying, is set.
7. A read document is merely attached to a spreadsheet if OCR or form recognition processing fails.
8. Reading or printing of a document is stopped in accordance with the limitations.
9. A user can select a higher-price service by sharing a processing load with another organization. If processing is executed only with a special processing load due to political reasons, it is executed with the limited application of resources. For example, if business cards are read, processing is executed using data indicating that all the read business cards are arranged on an A3-size sheet.

When using the above-described services, the administrator of an organization determines in advance to which amount of money within a predetermined credit the organization can use. The administrator also selects a job flow to be used by the organization from a job flow template provided by a service or creates a new job flow. The administrator may also set a default service level if necessary.

The administrator also determines a policy for setting the performance level depending on the wallet balance. In one example, when the wallet balance becomes less than 50%, the service level may be decreased by one rank; when the wallet balance becomes less than 25%, the service level may be decreased by two ranks; and when the wallet balance reaches 0%, the use of a service may be prohibited. In another example, when the wallet balance becomes less than 70%, the service level may be decreased by one rank; when the wallet balance becomes less than 50%, the service level may be decreased by two ranks, and when the wallet balance becomes less than 10%, the use of only the lowest price option may be allowed.

The administrator also registers the members of the organization in a cloud service which manages information processing terminals 13 and users. For example, the administrator creates a group of regular members who are allowed to use the wallet only within a limited amount of money and a group of premium members, such as managers, who can use the wallet without any limitation.

A scene where a user uses a job flow service will be discussed below.

The user starts an operation using a device, such as the image forming apparatus 12, and selects a desired job flow. At this time, depending on the job flow, the user may select the service level. For example, the user can select a service at a lower level and at a lower cost. As a default, the service level selected or created by the administrator of the organization is set.

A message about the completion of a job flow is displayed on the device used by the user or is sent as push notification to a device, such as the information processing terminal 13, linked with the user. The content of push notification is determined by the latest service level selected by the user.

When the user selects a job flow, if the wallet balance is sufficient, the job flow is executed with standard settings set by the administrator. Nevertheless, a service at a lower cost may be selected at the discretion of the user.

If the wallet balance is lower than or equal to a preset limit value, a message indicating that it is not possible to use a high-price operation based on the policy set by the administrator is sent and the user is advised or instructed to use a low-price operation. For example, in the case of a job flow including OCR processing, a lower-cost operation, such as within-several-hour-service or within-one-day-service OCR processing, may be recommended instead of real-time-service OCR processing.

If the wallet runs out of money, information indicating the exhaustion of the wallet is sent to the administrator so that the administrator can add money on the wallet, or the wallet becomes invalid and a message indicating that the wallet exceeds the limit is output.

Figure 7:
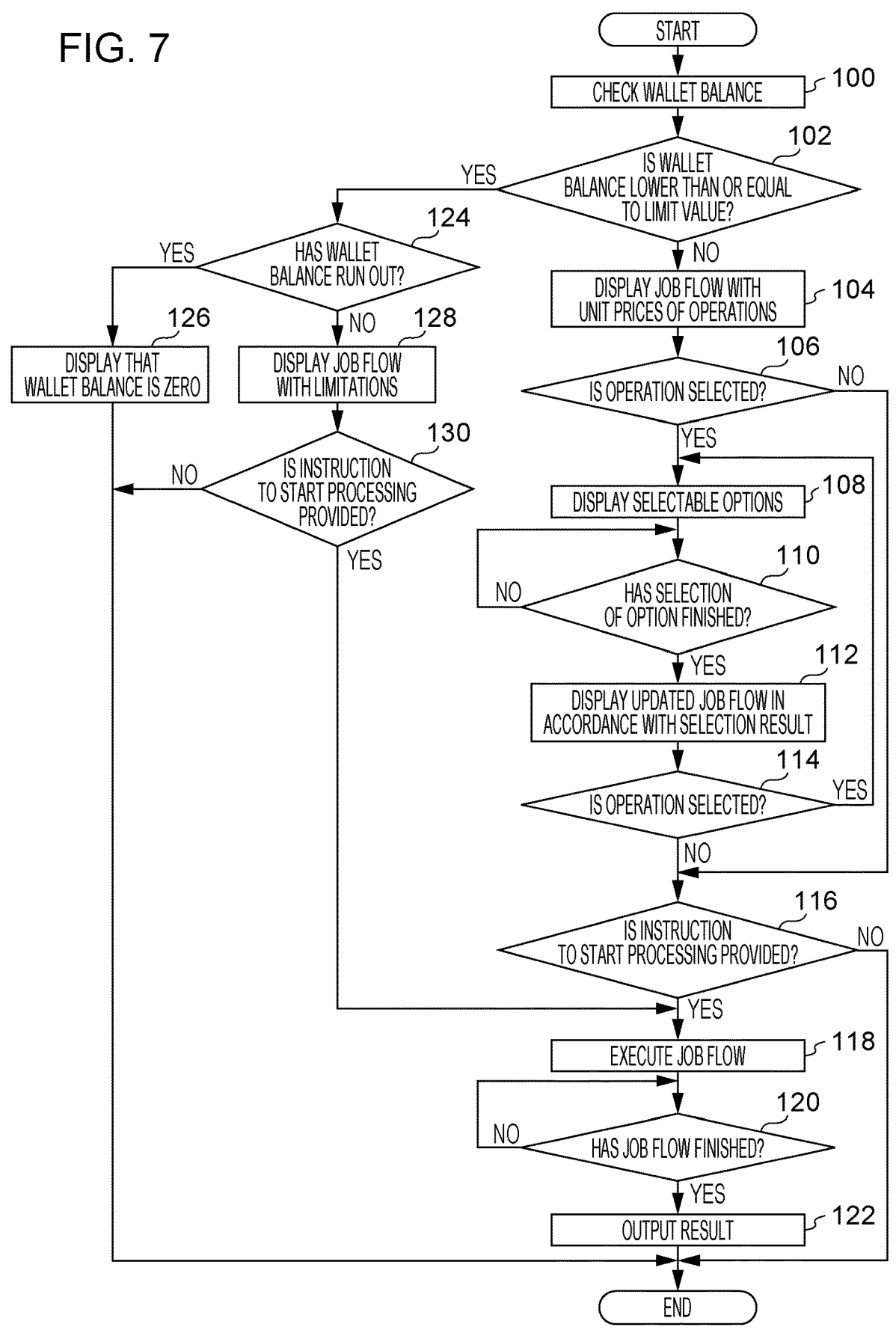
FIG. 7 is a flowchart illustrating an example of a procedure of processing executed by a cloud server, which functions as a job flow management mechanism of the information processing system according to the exemplary embodiment.

A description will be given below of an example of specific processing executed by the cloud server 18, which functions as the job flow management mechanism 11 of the information processing system 10 according to the exemplary embodiment. FIG. 7 is a flowchart illustrating an example of a procedure of processing executed by the cloud server 18. It is assumed that the processing shown in FIG. 7 starts when a job flow is selected after user authentication.

In step 100, the CPU 18A checks the wallet balance and proceeds to step 102.

In step 102, the CPU 18A determines whether the wallet balance is lower than or equal to a predetermined limit value. If the result of step 102 is NO, the CPU 18A proceeds to step 104. If the result of step 102 is YES, the CPU 18A proceeds to step 124.

In step 104, the CPU 18A displays a job flow with the unit prices of individual operations included in the job flow and proceeds to step 106. For example, as shown on the left side of FIG. 8, a default job flow preset by the administrator is displayed together with the unit prices of the individual operations.

In step 106, the CPU 18A determines whether an operation is selected. In the example in FIG. 8, the CPU 18A makes this determination according to whether "select OCR" is set. If the result of step 106 is YES, the CPU 18A proceeds to step 108. If the result of step 106 is NO, the CPU 18A proceeds to step 116.

In step 108, the CPU 18A displays options that can be selected by the user and proceeds to step 110. In the example in FIG. 8, the options for OCR processing are displayed together with the individual unit prices, as indicated on the right side in FIG. 8. In the example in FIG. 8, the screen for displaying the job flow and the screen for selecting a processing option are separate screens. However, this configuration is only an example. For instance, the screen for displaying a job flow and the screen for selecting a processing option may be displayed on the same screen.

Figure 8:
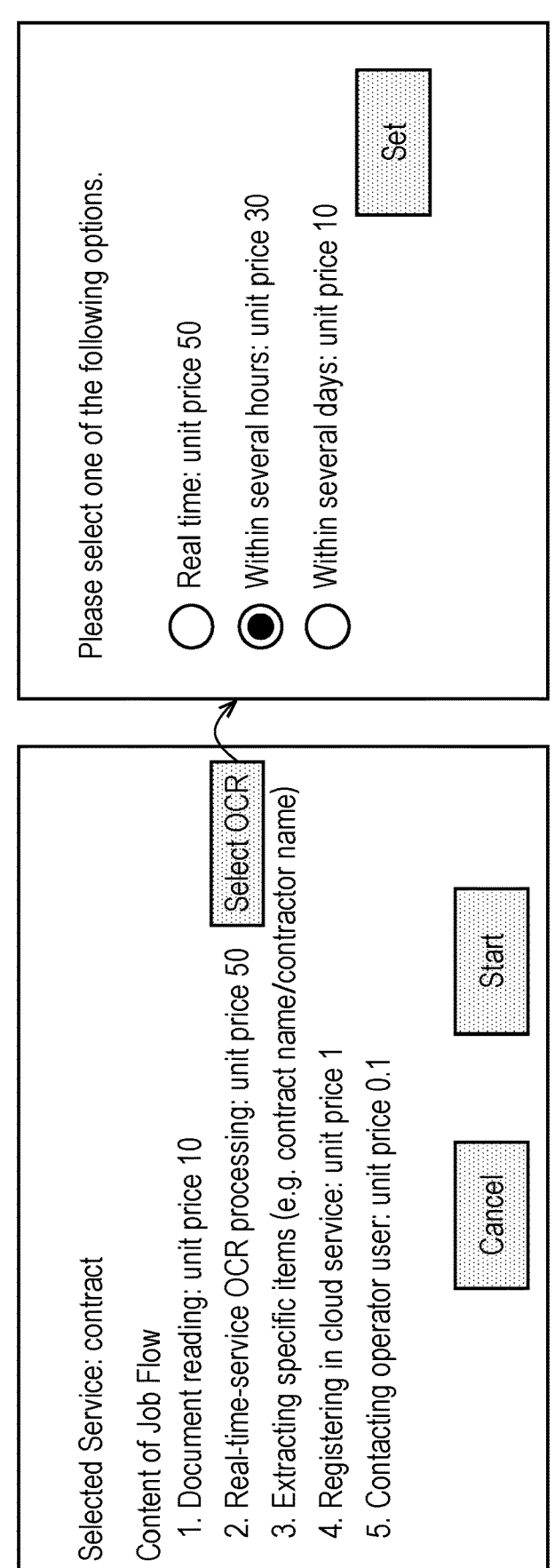
FIG. 8 illustrates a display example of a default job flow preset by an administrator, together with the unit prices of individual operations, and also illustrates a display example of selectable options for OCR processing together with the individual unit prices.

In step 110, the CPU 18A determines whether the selection of an option has finished. The CPU 18A makes this determination according to whether a "set" button in FIG. 8 is selected, for example. The CPU 18A waits until the result of step 110 becomes YES and then proceeds to step 112.

In step 112, the CPU 18A displays the updated job flow in accordance with the selection result and proceeds to step 114. For example, the CPU 18A displays a job flow, which is an update from the job flow indicated on the left side of FIG. 8, and also displays the updated unit price in accordance with the selection result.

In step 114, the CPU 18A determines whether an operation is selected. As in step 106, in the example in FIG. 8, the CPU 18A makes this determination according to whether "select OCR" is set. If the result of step 114 is YES, the CPU 18A returns to step 108. If the result of step 114 is NO, the CPU 18A proceeds to step 116.

In step 116, the CPU 18A determines whether the user provides an instruction to start processing. The CPU 18A makes this determination according to whether a "start" button in FIG. 8 is selected. If the result of step 116 is YES, the CPU 18A proceeds to step 118. If a "cancel" button is selected in the example in FIG. 8 and the result of step 116 becomes NO, the CPU 18A terminates the processing in FIG. 7.

In step 118, the CPU 18A executes the job flow and proceeds to step 120.

In step 120, the CPU 18A determines whether the job flow has finished. The CPU 18A waits until the result of step 120 becomes YES and then proceeds to step 122.

In step 122, the CPU 18A outputs a processing result and completes the processing in FIG. 7. For example, the CPU 18A notifies a registered device, such as the information processing terminal 13, of the user of the completion of the job flow by email, for example.

In step 124, the CPU 18A determines whether the wallet balance has run out. If the result of step 124 is YES, the CPU 18A proceeds to step 126. If the result of step 124 is NO, the CPU 18 proceeds to step 128.

In step 126, the CPU 18A displays that the wallet balance is zero and terminates the processing in FIG. 7. The user checks this information and requests the administrator to refill the wallet.

Figure 9:
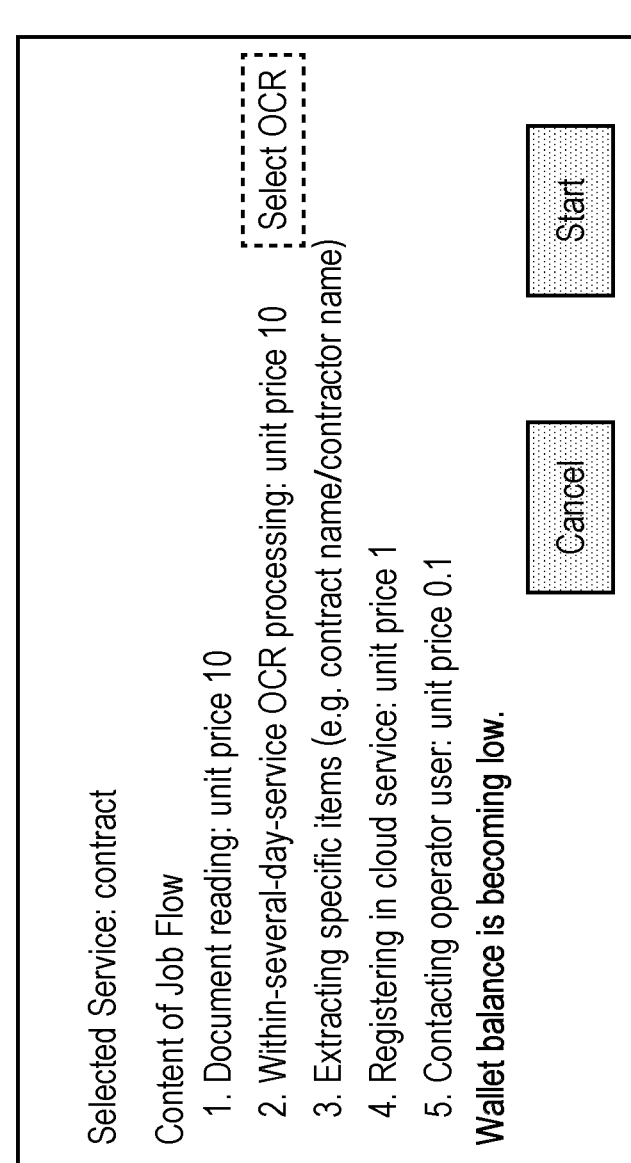
FIG. 9 illustrates a display example of a job flow with limitations preset by an administrator.

In step 128, the CPU 18A displays operations of the job flow with limitations and proceeds to step 130. For example, as illustrated in FIG. 9, the CPU 18A displays the job flow with limitations, which is preset by the administrator. The CPU 18A may also display information that the wallet balance is becoming low. In the example in FIG. 9, as OCR processing, a higher price option is automatically changed to a lower price option.

In step 130, as in step 116, the CPU 18A determines whether the user provides an instruction to start processing. If the result of step 130 is YES, the CPU 18A proceeds to step 118. If the result of step 130 is NO, the CPU 18A terminates the processing in FIG. 7.

In the above-described exemplary embodiment, options for which fees are set in accordance with the time required to execute processing are displayed by way of example. However, this configuration is only an example. In one example, as illustrated in FIG. 10, options for which fees are set in accordance with the operation performance may be displayed. In another example, as illustrated in FIG. 11, options for which fees are set in accordance with a combination of the operation performance and the required time may be displayed. FIG. 10 illustrates an example of options for which fees are set in accordance with the operation performance. FIG. 11 illustrates an example of options for which fees are set in accordance with a combination of the operation performance and the required time.

Operations executed by the individual elements of the information processing system 10 according to the above-described exemplary embodiment may be implemented by any one of software, hardware, and a combination of software and hardware. Operations executed by the individual elements of the information processing system 10 may be stored in a storage medium as a program and be distributed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:
a processor configured to:
    receive an instruction to execute sequential processing, the sequential processing being processing for sequentially executing multiple preset operations which are related to each other;
    present plural options for an operation included in the sequential processing, fees for the plural options being different from each other; and
    calculate a fee for an option selected from the plural options and present the calculated fee before executing the sequential processing.

11

(((2)))

The information processing apparatus according to (((1))), wherein the processor is configured to present, as the plural options, options for which predetermined fees are set in accordance with at least one of performance of an operation and a time required to execute the operation.

(((3)))

The information processing apparatus according to (((1))) or (((2))), wherein the processor is configured to present an option which is preset by an administrator as a standard setting for a corresponding operation included in the sequential processing.

(((4)))

The information processing apparatus according to (((3))), wherein the processor is configured to change the option to be presented in accordance with a remaining budget.

(((5)))

The information processing apparatus according to (((3))), wherein the processor is configured to recommend an option whose fee is lower than a fee for the standard setting or to provide an instruction to accept the recommended option if a remaining budget is lower than or equal to a predetermined limit value.

(((6)))

The information processing apparatus according to (((1))), wherein the processor is configured to provide information on completion of the sequential processing after the sequential processing has finished.

(((7)))

The information processing apparatus according to (((6))), wherein the processor is configured to provide the information as push notification to an information processing terminal linked with a user.

(((8)))

An information processing system comprising:
the information processing apparatus according to any one of (((1))) to (((7))); and
an image forming apparatus that makes it possible to perform an operation for selecting the sequential processing and providing an instruction to execute the sequential processing.

(((9)))

An information processing program for causing a computer to execute a process, the process comprising:
receive an instruction to execute sequential processing, the sequential processing being processing for sequentially executing multiple preset operations which are related to each other;
presenting plural options for an operation included in the sequential processing, fees for the plural options being different from each other; and
calculating a fee for an option selected from the plural options and presenting the calculated fee before executing the sequential processing.

What is claimed is:
1. An information processing apparatus comprising:
a processor configured to:
receive an instruction to execute sequential processing, the sequential processing being processing for sequentially executing a plurality of preset operations which are related to each other;
present a plurality of options for an operation included in the sequential processing, fees for the plurality of options being different from each other;

calculate a fee for an option selected from the plurality of options and present the calculated fee before executing the sequential processing;
present a standard option which is preset by an administrator as a standard setting for a corresponding operation included in the sequential processing; and
recommend an option of the plurality of options whose fee is lower than a fee for the standard setting or provide an instruction to accept the recommended option if a remaining budget is lower than or equal to a predetermined limit value.

2. The information processing apparatus according to claim 1, wherein the processor is configured to present, as the plurality of options, options for which predetermined fees are set in accordance with at least one of performance of an operation and a time required to execute the operation.

3. The information processing apparatus according to claim 1, wherein the processor is configured to change the option to be presented in accordance with a remaining budget.

4. The information processing apparatus according to claim 1, wherein the processor is configured to provide information on completion of the sequential processing after the sequential processing has finished.

5. The information processing apparatus according to claim 4, wherein the processor is configured to provide the information as push notification to an information processing terminal linked with a user.

6. An information processing system comprising:
the information processing apparatus according to claim 1; and
an image forming apparatus that makes it possible to perform an operation for selecting the sequential processing and providing an instruction to execute the sequential processing.

7. An information processing method comprising:
receiving an instruction to execute sequential processing, the sequential processing being processing for sequentially executing a plurality of preset operations which are related to each other;
presenting a plurality of options for an operation included in the sequential processing, fees for the plurality of options being different from each other;
calculating a fee for an option selected from the plurality of options and presenting the calculated fee before executing the sequential processing;
presenting a standard option which is preset by an administrator as a standard setting for a corresponding operation included in the sequential processing; and
recommending an option of the plurality of options whose fee is lower than a fee for the standard setting or providing an instruction to accept the recommended option if a remaining budget is lower than or equal to a predetermined limit value.

8. A non-transitory computer readable medium storing a program causing a computer to execute a process, the process comprising:
receiving an instruction to execute sequential processing, the sequential processing being processing for sequentially executing a plurality of preset operations which are related to each other;
presenting a plurality of options for an operation included in the sequential processing, fees for the plurality of options being different from each other;
calculating a fee for an option selected from the plurality of options and presenting the calculated fee before executing the sequential processing, wherein:

presenting a standard option which is preset by an administrator as a standard setting for a corresponding operation included in the sequential processing; and recommending an option of a plurality of options whose fee is lower than a fee for the standard setting or providing an instruction to accept the recommended option if a remaining budget is lower than or equal to a predetermined limit value.

\* \* \* \* \*